United States Patent [19]

Freeland et al.

[11] Patent Number: 4,509,241

[45] Date of Patent: Apr. 9, 1985

[54] COMBINATION BEARING REMOVAL AND INSTALLATION TOOL

[76] Inventors: John A. Freeland, 6901 Scio Church Rd.; Robert D. Freeland, 907 Sunnyside, both of Ann Arbor, Mich. 48103

[21] Appl. No.: 597,886

[22] Filed: Apr. 9, 1984

[51] Int. Cl.³ .............................................. B23P 19/04
[52] U.S. Cl. ...................................................... 29/263
[58] Field of Search ............................ 29/256, 263–265

[56] References Cited

U.S. PATENT DOCUMENTS

| 1,422,390 | 7/1922 | Timm | 29/263 |
| 1,585,176 | 5/1926 | Stumbaugh | 29/256 |
| 1,608,800 | 11/1926 | Martin | 29/263 |
| 2,914,330 | 11/1959 | Wheeler | 29/256 |
| 4,050,136 | 9/1977 | Shultz | 29/263 |

FOREIGN PATENT DOCUMENTS 238478   8/1925   United Kingdom ................. 29/263

*Primary Examiner*—Robert C. Watson
*Attorney, Agent, or Firm*—Stephenson & Boller

[57] ABSTRACT

A combination bearing removal and installation tool provides for the removal and installation of an annular bearing assembly from and in a spindle-receiving bore of a strut type vehicle wheel spindle supporting system without the need to disassemble any of the supporting system from the vehicle. The tool comprises a threaded shaft having a head at one end and a cup threaded onto the shaft from the other end. In the bearing removal mode of operation the open end of the cup faces the head end so that when the head is actuated to remove a bearing from the bore the bearing passes into the cup. In the bearing installation mode of operation the cup is reversed on the shaft so that an end wall of the cup bears against the end of the bore. This end of the cup comprises at least one frusto-conically tapered surface seating the cup against a corresponding tapered surface at the end of the bore and a locator projects from the end of the cup to be abutted by a set of bearings being installed thereby accurately locating the bearings when the head of the shaft is actuated to advance a new set of bearings into the bore. The tool can also be used to press a wheel spindle into a newly installed set of bearings.

20 Claims, 6 Drawing Figures

COMBINATION BEARING REMOVAL AND INSTALLATION TOOL

BACKGROUND AND SUMMARY OF THE INVENTION

This invention relates to a combination bearing removal and installation tool, particularly a tool which is adapted for removing and installing an annular bearing assembly from and in a spindle-receiving bore of a strut-type vehicle wheel spindle supporting system.

Many current automobile designs use what is commonly known as a McPherson type wheel mount system. That system comprises a wheel spindle which rotates in a bearing installed in a hole that is open at both ends. The hole that is open at both ends is in a member that forms a part of a strut mount for the wheel. The wheel may be either a steered wheel, such as a front wheel of a vehicle, or a non-steered wheel, such as a rear wheel of a vehicle. Moreover the wheel may be either a driven or a non-driven wheel. In the ensuing description and claims, reference to a strut-type wheel spindle supporting system is intended to include the various possible combinations constituting what are commonly referred to as McPherson type mounts.

Automotive manufacturers specify certain procedures for repair and maintenance of the vehicles which they manufacture. For removing the wheel bearing assembly of a McPherson type wheel mount, such as in the case of a front wheel for example, the specified procedure involves disassembly of a part of the strut system from the vehicle. In this particular case the part disassembled from the vehicle is the steering knuckle. Once the knuckle has been removed from the vehicle, it is placed in a suitable fixture where a tool such as a press is used to remove the bearing assembly from the wheel spindle mounting hole. Once the old bearing assembly has been removed, the press is once again used to install a new set of bearings. Then the knuckle is reassembled to the vehicle.

The procedure for replacement of wheel bearings is thus seen to comprise a significant amount of time and labor. This makes a wheel bearing replacement procedure expensive to the manufacturer in the case of a vehicle still under warranty and expensive to the car owner when the vehicle is out of warranty.

The present invention is directed to a new and improved tool which can be used for both removal and installation of wheel bearings from and in a McPherson type wheel mount system without the need to disassemble any part of the strut system from the vehicle. Hence in the example just given, it would be unnecessary to disassemble the steering knuckle from the vehicle.

The invention can significantly reduce the amount of time and labor required to replace a wheel bearing assembly thereby yielding savings to the manufacturer in the case of a replacement of bearings in a vehicle under warranty and to the consumer where the vehicle is no longer within the warranty period.

Moreover, because less disassembly is required, there is less likelihood that the reassembly procedure will be incorrectly performed.

The tool also possesses the advantage of being useful for both removal of an old bearing assembly and installation of a new one. The tool is adapted to respective removal and installation modes of operation by a quick and convenient reversal of parts. Moreover the tool itself comprises a very small number of component parts. It is economical, compact, and well suited for use by shop personnel who typically perform bearing removal and installation procedures.

A still further advantage of the invention is that a single tool can be used for different types of vehicles. The present invention is disclosed in an embodiment which is adapted for two different types of models by way of example.

Another advantage of the invention is that when it is used to remove a bearing assembly the removed bearing assembly is captured by the tool and in that way there is less likelihood of the assembly falling on the ground or onto the person using the tool.

When the tool is used in the installation mode to install a new bearing assembly, it provides an accurate locator for the new bearing assembly, and this is another important aspect of the invention.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
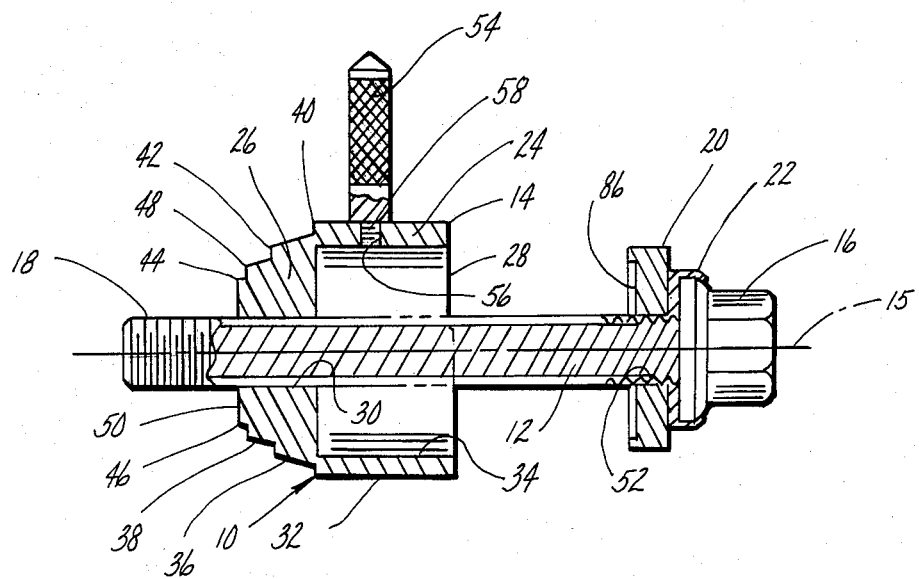
FIG. 1 is a longitudinal view, partly in section, of a bearing removal and installation tool embodying principles of the present invention.
Figure 2:
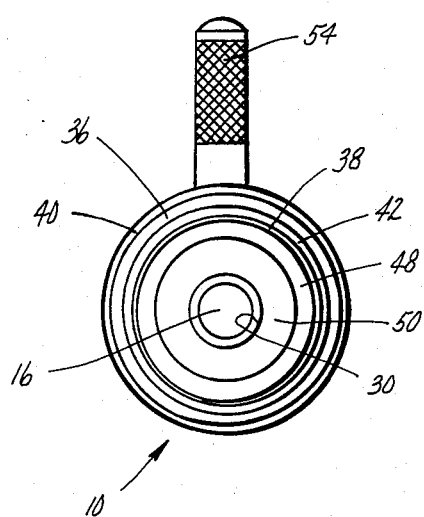
FIG. 2 is a left hand end view of FIG. 1.
Figure 3:
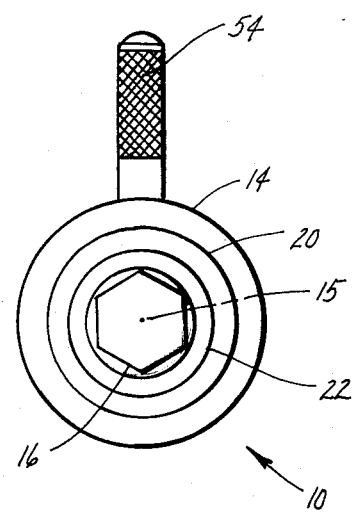
FIG. 3 is a right hand end view of FIG. 1.

FIGS. 1, 2, and 3 illustrate a preferred embodiment of a combination bearing removal and installation tool 10 according to the present invention. Tool 10 comprises a shaft 12 and a cup 14. Shaft 12 and cup 14 are coaxial with an imaginary axis 15.

Shaft 12 has an integral head 16 of non-circular cross section at one end. A screw thread 18 extends around the outside of shaft 12 from head 16 to the opposite end.

A circular annular element 20 and an anti-friction bearing assembly 22 are disposed on shaft 12 between cup 14 and head 16 with the anti-friction bearing assembly 22 being disposed axially between element 20 and head 16.

Cup 14 comprises a sidewall 24 of circular cross section. The cup is further provided with an end wall 26 at one axial end of sidewall 24 while the opposite end of the sidewall is open, as indicated by the reference numeral 28.

End wall 26 comprises a central threaded hole 30 via which cup 14 threads onto shaft 12.

Both annular element 20 and anti-friction bearing assembly 22 have central holes which allow them to be assembled onto shaft 12 prior to threading of cup 14 onto shaft 12.

FIG. 1 illustrates tool 10 in what is referred to as the bearing removal mode of operation. This mode of operation is characterized by the open end 28 of cup 14 facing toward head 16, i.e. toward the right as viewed in FIG. 1. The tool is also operable to a bearing installation mode of operation by unthreading cup 14 from shaft 12, reversing the cup 180°, and then rethreading the cup back onto shaft 12 such that end wall 26 is toward head 16.

These two respective modes of operation will be explained in greater detail in subsequent description and drawing figures illustrating usage of the tool in removing and installing bearings.

As can be seen from consideration of FIG. 1, sidewall 24 has a uniform outside diameter (O.D.) identified by the reference numeral 32. It also has a uniform inside diameter (I.D.) designated by the reference numeral 34.

Cup 14 is preferably constructed as a machined part with end wall 26 being constructed to provide certain advantageous features. In this regard, end wall 26 comprises one or more frusto-conically tapered surfaces extending around the outside of the cup. The illustrated embodiment of tool 10 comprises two such frusto-conically tapered surfaces which are identified by the respective reference numerals 36 and 38.

Frusto-conically tapered surface 36 is immediately adjacent sidewall 24 but is separated at its largest diameter from O.D. 32 by means of an axially facing shoulder 40 which is preferably in a plane perpendicular to axis 15.

Frusto-conically tapered surface 38 lies immediately adjacent frusto-conically tapered surface 36 on the side of the latter opposite sidewall 24. The maximum diameter of frusto-conically tapered surface 38 is less than the smallest diameter of frusto-conically tapered surface 36 because a shoulder 42 is provided at their juncture. Shoulder 42, like shoulder 40, is preferably disposed in a plane perpendicular to axis 15.

End wall 26 further comprises a locator 44 which projects axially away from the cup. Locator 44 has a uniform O.D. 46 which is made less than the smallest diameter of frusto-conically tapered surface 38 by a shoulder 48 provided between the two. Shoulder 48, like shoulders 42 and 40, is preferably in a plane perpendicular to axis 15. Locator 44 further comprises a distal end face 50 which is in a plane perpendicular to axis 15.

The particular significance of the detailed construction of end wall 26 will become more apparent from the ensuing description and drawings illustrating usage of the tool. It is also to be observed that I.D. 34 corresponds substantially to the smallest diameter of frusto-conically tapered surface 36, i.e. the diameter of surface 36 at the location where it meets shoulder 42.

Element 20 is provided with a central circular hole 52 having a diameter just slightly larger than the diameter across the crests of thread 18 so as to allow element 20 to just freely pass onto the threaded portion of the shaft.

Head 16 is preferably hexagonally shaped of a standardized dimension so as to be operable by means of a correspondingly shaped wrench (not shown), either manual or powered, to rotate shaft 12 when the tool is in use. Anti-friction bearing assembly 22 is preferably included so as to allow head 16 to rotate relative to element 20 with minimal resistance between them.

The O.D. of element 20 is also made just slightly less than I.D. 34 of the cup.

In order to facilitate usage of the tool it may be desirable to include a knurled projection 54 on cup 14. This can be done in the manner shown by drilling and tapping a small hole 56 in sidewall 24 and providing the proximal end of the knurled projection 54 with a short screw thread 58 which allows it to be threaded into hole 56 and securely tightened, but without the end of screw thread 58 projecting into the interior of the cup.

Figure 4:
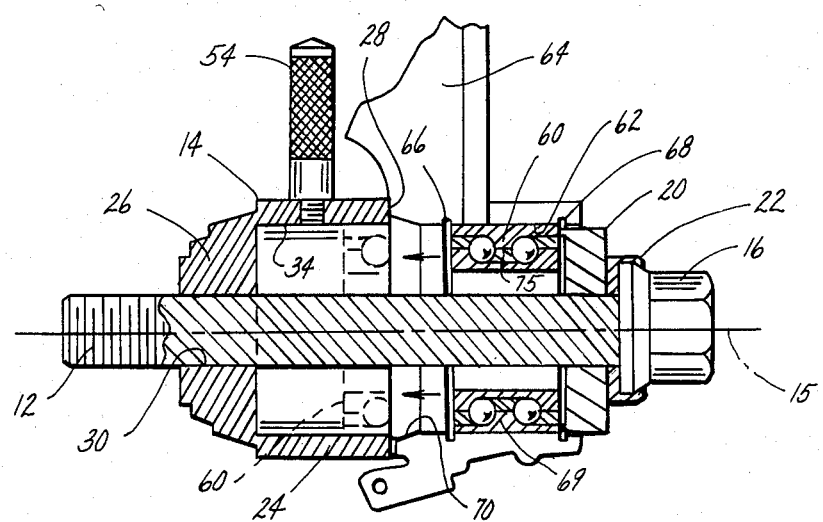
FIG. 4 is a view similar to FIG. 1 illustrating the tool in use in the bearing removal mode of operation on a particular model of wheel mount.

FIG. 4 illustrates tool 10 in its bearing removal mode of operation. FIG. 4 illustrates the tool in use in removing an annular bearing assembly 60 from a spindle-receiving hole, or bore, 62 of a member of vehicle wheel spindle supporting system designated by the general reference numeral 64. As explained in the introductory portion of this specification, the spindle supporting system is characterized by the spindle (not shown in FIG. 4) being journaled by a bearing assembly (bearing assembly 60) within a hole (hole 62) which is open at both ends. Also, the invention contemplates that the wheel spindle supporting system may be for a steered or non-steered wheel, and a driven or non-driven wheel.

Bearing assembly 60 is disposed in bore 62 with substantially a press fit. In order to guard against displacement of the bearing assembly from its intended position of installation within bore 62, the bore is provided with a pair of circumferentially extending grooves 66 and 68 respectively which lie immediately adjacent opposite axial ends of the bearing assembly. With the bearing assembly in its desired position of installation, annular retention rings (not shown) are lodged within the respective grooves 66 and 68 and the inner margins of the retention rings extend into the bore so as to entrap axially the outer bearing race 69 of bearing assembly 60 within the bore. Prior to use of tool 10 to remove the bearing assembly, the retention rings are removed from the respective grooves 66 and 68 and that is why the grooves are empty in FIG. 4.

It should also be pointed out that the wheel spindle and any associated mechanism are also removed but it is unnecessary to disassemble any of the strut system 64.

After the retention rings have been removed from grooves 66 and 68, the tool can be used to remove the bearing assembly. First cup 14 is unthreaded from shaft 12. The shaft is inserted through bearing assembly 60 from one end of bore 62, in this case the right hand end as viewed in FIG. 4. The cup is positioned such that its open end 28 faces toward the bore, and the cup is threaded onto shaft 12.

Cup 14 is arranged such that its open end 28 bears against member 64 around bore 62. It will be observed that the end of bore 62 toward which end 28 of cup 14 is disposed has a frusto-conical taper 70 forming a lead slightly larger than the nominal diameter 62. The I.D. 34 of cup 14 is substantially identical to, preferably just slightly larger than, the nominal diameter of bore 62. The O.D. of element 20 is just slightly less than the diameter of bore 62 so that the former can pass into the latter whereby the end face of element 20 which is toward cup 14 may be brought into confrontation with the right hand axial end of bearing assembly 60 as shown in FIG. 4.

Continued rotation of head 16 from the FIG. 4 condition in a sense which is effective to advance shaft 12 to the left will similarly be effective to urge the bearing assembly in the same direction. Head 16 acts through anti-friction bearing assembly 22 on element 20 with the latter forming a bearing engaging means to engage the bearing assembly and advance it to the left.

As the bearing assembly is advanced out of bore 62 it passes into the interior of cup 14. The axial dimension of the interior of cup 14 is such that it is capable of receiving substantially the entire axial dimension of the bearing assembly. In this way when the bearing assembly has been completely removed from bore 62, cup 14 contains the bearing assembly. The tool, and captured bearing assembly, may then be removed by unthreading the cup from the shaft and removing the shaft from the bore.

Tool 10 may also be used to install a new set of bearings. This is done in the following manner as explained in reference to FIG. 5 which shows the final installed position of the bearing.

First, the inner retention ring 72 is disposed in groove 66. A new replacement bearing assembly 74 is tapped partly into bore 62 from the wheel side (i.e. from the right side as viewed in FIG. 5). Cup 14 is positioned with its end wall 26 toward bore 62. In this regard it will be observed that the frusto-conically tapered surface 36 is so arranged as to seat on the frusto-conically tapered surface 70. The relationship of surface 50 on the cup relative to surface 38 defines a set length from a datum for a given strut system whereby with the frusto-conically tapered surface 36 seating against the frusto-conical taper 70 at the end of bore 62, end surface 50 is disposed in predetermined relation to bore 62 so as to provide a locator for accurately locating the bearing assembly which is being installed. In this instance the locator's end surface 50 is adapted to abut the inner race 75 of the bearing assembly being installed. By providing such a datum to length relationship in the cup, the tool prevents overloading of retention ring 72 during installation of the new bearing, and it also prevents movement of inner race 75 when the tool is subsequently used to install the wheel spindle and hub as will be seen from the ensuing description of FIG. 6.

Figure 5:
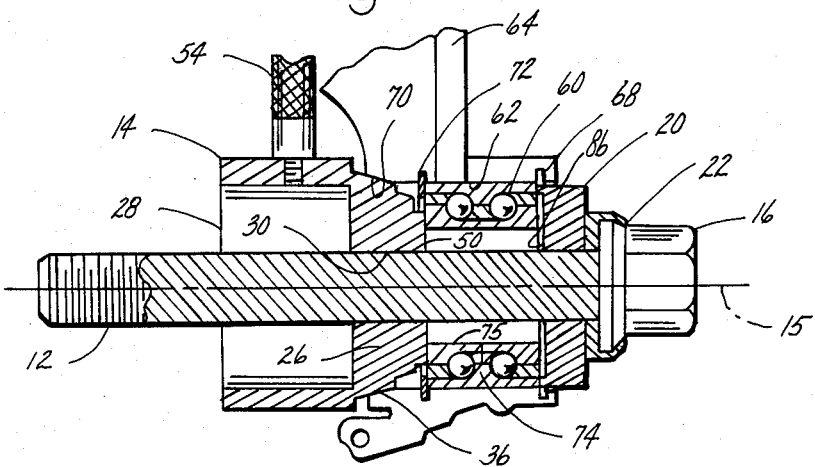
FIG. 5 is a view of the tool of FIG. 1 in use in the bearing installation mode of operation showing the installation of a replacement set of bearings in the same type of wheel mount as FIG. 4.

Continuing with the installation description, with reference to FIG. 5, shaft 12 is passed through the new bearing assembly 74 whose left hand end has been tapped into the right hand end of bore 62, and the shaft is threaded into hole 30 of the cup so as to bring the inner face of element 20 into abutment with the right hand end of bearing assembly 74.

Continued operation of the shaft by rotating head 16 such that the shaft is advanced to the left as viewed in FIG. 5 will be effective to press the bearing assembly into the bore until the condition of FIG. 5 is obtained. Continued tightening will be ineffective to produce any further advancement of the bearing assembly because the cup forms a locator limiting the advancement of the bearing assembly as noted above without overstressing the inner ring 72.

It will be observed that the construction of end wall 26 is such that clearance is provided to retention ring 72 so that the end wall of the cup does not contact that retention ring.

With the bearing assembly having been installed, the shaft is unthreaded from the cup by rotating head 16 in the opposite direction. Both cup and shaft are removed and the second retention ring 77 for groove 68 can be installed. (See FIG. 6).

Figure 6:
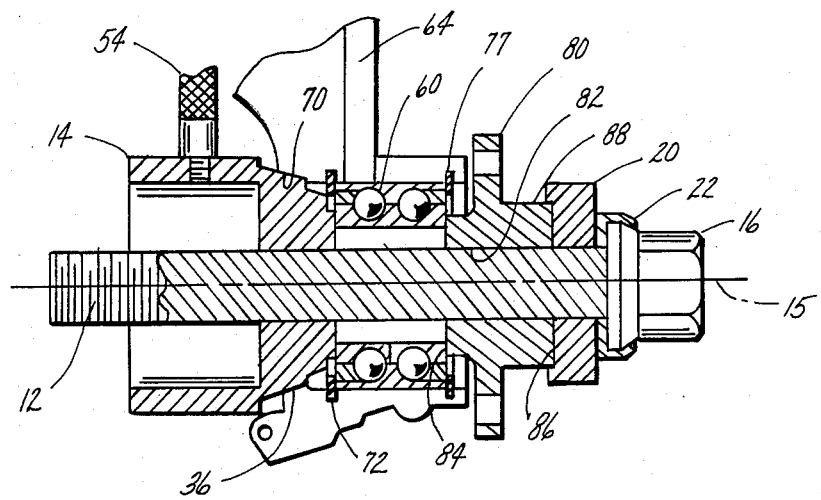
FIG. 6 is a view showing an additional use of the tool representing a further step of procedure beyond that shown by FIG. 5.

It is now possible to also use the tool to press the wheel spindle and hub 80 into the bearing. This is illustrated in FIG. 6. The cup is disposed in the same general position as when the bearing assembly is being installed. Now, however, the left hand end of the hub spindle is tapped into the inner race 75 of the bearing assembly.

Shaft 12 is passed through the bore 82 of the spindle and hub from the right as viewed in FIG. 6 and is threaded into hole 30 in the end wall of the cup. Operation of the shaft via head 16 so as to advance shaft 12 to the left in FIG. 6 will cause the head to be effective via bearing means 22 and element 20 to urge the spindle and hub to the left so as to bring a shoulder 84 of the spindle and hub into abutment with the inner bearing race. The shaft is then unthreaded from the cup and both shaft and cup removed.

Element 20 may be provided with a shallow central depression 86 having a diameter just greater than the outside diameter 88 of the spindle and hub at its end whereby when the tool is operated to install spindle and hub, the end of the spindle and hub seats in the depression. This can facilitate the spindle and hub installation procedure.

The construction also provides for the ability of the same tool to be used on a different sized wheel spindle system. This capability is provided by the second frusto-conically tapered surface 38. Surface 38 provides for the use of the tool with a smaller diameter bore 60 and a smaller diameter taper 70 at the end of the smaller diameter bore 60. In such a case the frusto-conically tapered surface 38 seats against the corresponding taper 70, and the tool provides the appropriate length to datum relationship between the surface 38 and the end surface 50 which locates the bearing assembly being installed. Because the I.D. 34 of the cup is designed for a larger diameter bore 60 such as illustrated in the drawing, it will be effective to receive the bearing assembly which is removed from a bore of smaller diameter.

By way of example only, the illustrated embodiment of tool is particularly suited for use in removing wheel bearings from an Audi Fox front strut system by having the frusto-conically tapered surface 36 bearing against the strut system around the spindle receiving bore while the other surface 38 is adapted for a Volkswagen Rabbit.

Although this is the presently preferred configuration of the invention, it will be appreciated that principles are applicable to various embodiments depending upon the particular dimensions involved for any given vehicle. Hence, it is possible for any given tool embodying principles of the invention to be useful for a single vehicle model or multiple models.

The invention is compact and convenient to use, not requiring disassembly of the strut system from the vehicle. All that need be done in order to render the tool effective for removing a bearing assembly is to remove the wheel spindle and if necessary to disconnect any operative connection to the wheel spindle such as would be the case where the spindle is driven by means of a drive shaft thereby rendering that particular wheel a driven as distinguished from a non-driven wheel.

While a preferred embodiment of the invention has been disclosed, it will be appreciated that principles are applicable to other embodiments.

What is claimed is:

1. A combination bearing removal and installation tool adapted for use in removing and installing an annular bearing assembly from and in a spindle-receiving bore of a vehicle wheel spindle supporting system without the need to disassemble the wheel spindle supporting system from the vehicle, said tool comprising a shaft having a thread and a cup coaxial with said shaft, said cup having a sidewall open at one axial end and an end wall at the opposite axial end, said end wall having a threaded hole via which said cup threads coaxially onto said shaft, actuating means for rotating said shaft relative to said cup, and bearing engaging means operable by said actuating means for advancing a bearing assembly toward said cup when the tool is in use, said cup being reversible on said shaft by unthreading the cup from the shaft, reversing the cup and then rethreading it onto the shaft, such reversibility endowing the tool with respective bearing removal and bearing installation modes of operation, said bearing removal mode of operation being characterized by said cup being disposed at an end of the spindle-receiving bore with its open axial end facing toward the bore, and said bearing installation mode of operation being characterized by the end wall of said cup facing toward the bore, the tool being operable in the bearing removal mode of operation such that operation of said actuating means causes said bearing engaging means to engage a bearing assembly in the bore from the end of the bore opposite the end at which said cup is disposed and to advance along said shaft and displace the bearing assembly from the bore and into said cup, the tool being operable in the bearing installation mode of operation such that operation of said actuating means causes said bearing engaging means to engage a bearing assembly and advance it along said shaft from the end of the bore opposite said cup to dispose the bearing assembly within the bore, said cup having on its end wall a locator which, when the tool is in the bearing installation mode of operation, is disposed in predetermined relation to the bore for abutment by the bearing assembly being installed thereby to accurately locate same in a desired installation position within the bore.

2. A combination bearing removal and installation tool as set forth in claim 1 in which said actuating means comprises a head of non-circular cross section on said shaft.

3. A combination bearing removal and installation tool as set forth in claim 2 in which said bearing engaging means comprises an annular element disposed generally coaxially on said shaft and disposed axially between said head and said cup.

4. A combination bearing removal and installation tool as set forth in claim 3 including anti-friction bearing means disposed between said head and said annular element.

5. A combination bearing removal and installation tool as set forth in claim 1 in which said actuating means is so disposed on said shaft as to be at the opposite end of the bore from said cup in both said modes of operation.

6. A combination bearing removal and installation tool as set forth in claim 1 including a radial projection extending radially outwardly of the sidewall of said cup.

7. A combination bearing removal and installation tool as set forth in claim 1 in which the open axial end of the sidewall of said cup is arranged to bear against a portion of the wheel spindle supporting system around the spindle-receiving bore thereof when the tool is in use.

8. A combination bearing removal and installation tool as set forth in claim 1 in which said end wall of said cup has a radially outer portion which, when the tool is used in the installation mode of operation, is arranged to bear against a portion of the wheel spindle supporting system around the spindle-receiving bore thereof and also has a radially inner portion forming said locator.

9. A combination bearing removal and installation tool as set forth in claim 8 in which said radially inner portion projects axially beyond said radially outer portion in a direction away from said cup.

10. A combination bearing removal and installation tool as set forth in claim 8 in which said radially outer portion comprises a frusto-conically tapered surface coaxial with said shaft.

11. A combination bearing removal and installation tool as set forth in claim 10 in which said radially inner portion comprises a distal end surface disposed in a plane perpendicular to the length of said shaft and arranged, in the installation mode of operation, for abutment by a bearing assembly being installed.

12. A combination bearing removal and installation tool as set forth in claim 1 in which said end wall comprises plural frusto-conically tapered surfaces coaxial with said shaft.

13. A combination bearing removal and installation tool as set forth in claim 12 in which immediately adjacent ones of said plural frusto-conically tapered surfaces are separated by a shoulder.

14. A combination bearing removal and installation tool as set forth in claim 13 in which the dimensional characteristics of immediately adjacent ones of said plural frusto-conically tapered surfaces are different.

15. A combination bearing removal and installation tool as set forth in claim 13 in which said locator projects axially beyond said plural frusto-conically tapered surfaces in a direction away from said cup and is separated from an immediately adjacent one of said plural frusto-conically tapered surfaces by means of a shoulder.

16. A combination bearing removal and installation tool as set forth in claim 1 including a shoulder at the juncture of said sidewall and said end wall extending circumferentially around the outside of said cup.

17. A combination bearing removal and installation tool as set forth in claim 16 including a frusto-conically tapered surface extending circumferentially around the outside of said cup and axially from said shoulder in a direction away from said sidewall, said locator extending axially beyond said frusto-conically tapered surface in a direction away from said cup and said locator having a diameter less than the smallest diameter of said frusto-conically tapered surface.

18. A combination bearing removal and installation tool as set forth in claim 17 including a second frusto-conically tapered surface extending circumferentially around the outside of said cup and disposed axially between the first-mentioned frusto-conically tapered surface and said locator, said second frusto-conically tapered surface having maximum and minimum diameters in a range between the smallest diameter of said first-mentioned frusto-conically tapered surface and the diameter of said locator.

19. A combination bearing removal and installation tool as set forth in claim 17 in which the interior of said cup has an inside diameter substantially equal to the smallest diameter of said frusto-conically tapered surface.

20. In a tool useful in installing an annular bearing assembly in a spindle-receiving bore of a vehicle wheel spindle supporting system without the need to disassemble the wheel spindle supporting system from the vehicle, said tool comprising a shaft having a thread and a member coaxial with said shaft, said member having a threaded hole via which said member threads coaxially onto said shaft, actuating means for rotating said shaft relative to said member, and bearing engaging means operable by said actuating means for advancing a bearing assembly toward said member when the tool is in use with said member being disposed at an end of the spindle-receiving bore, the tool being operable such that operation of said actuating means causes said bearing engaging means to engage a bearing assembly in the bore from the end of the bore opposite the end at which said member is disposed and to advance along said shaft from the end of the bore opposite said member to dispose the bearing assembly within the bore, said member having on its end wall a locator which, when the tool is in the bearing installation mode of operation, is disposed in predetermined relation to the bore for abutment by the bearing assembly being installed thereby to accurately locate same in a desired installation position within the bore, said member comprising a frusto-conically tapered surface of larger diameter than said locator, said frusto-conically tapered surface being adapted to bear against a complementary taper at the end of the bore at which said member is disposed.

* * * * *